(12) United States Patent
Yang et al.

(10) Patent No.: US 8,718,013 B2
(45) Date of Patent: May 6, 2014

(54) HANDOVER BETWEEN LEGACY AND NON-LEGACY WIMAX NETWORKS

(75) Inventors: Xiangying Yang, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 13/041,371

(22) Filed: Mar. 5, 2011

(65) Prior Publication Data

US 2011/0216740 A1    Sep. 8, 2011

Related U.S. Application Data

(60) Provisional application No. 61/311,174, filed on Mar. 5, 2010.

(51) Int. Cl.
*H04W 4/00* (2009.01)
(52) U.S. Cl.
USPC ........................................................ 370/331
(58) Field of Classification Search
USPC ......... 370/331, 328, 335, 338, 342, 465, 320, 370/310, 310.2, 315, 313
See application file for complete search history.

(56) References Cited

U.S. PATENT DOCUMENTS

| | | | |
|---|---|---|---|
| 8,432,870 B2 * | 4/2013 | Maheshwari et al. ........ 370/331 |
| 2008/0161000 A1 | 7/2008 | Li et al. | |
| 2009/0181680 A1 | 7/2009 | Kim et al. | |
| 2009/0196257 A1 | 8/2009 | Kim et al. | |
| 2009/0207751 A1 * | 8/2009 | Attanasio et al. ............. 370/252 |
| 2010/0085936 A1 * | 4/2010 | Bellamkonda et al. ....... 370/331 |
| 2010/0098025 A1 * | 4/2010 | Chen et al. .................... 370/331 |
| 2010/0260142 A1 * | 10/2010 | Jung et al. ..................... 370/331 |
| 2011/0134887 A1 * | 6/2011 | Jeon et al. ..................... 370/331 |

FOREIGN PATENT DOCUMENTS

| | | |
|---|---|---|
| JP | 2009111493 A | 5/2009 |
| JP | 2011526769 A | 10/2011 |
| JP | 2011527548 A | 10/2011 |
| KR | 1020090082115 A | 7/2009 |
| WO | WO-2009093878 A1 | 7/2009 |
| WO | WO-2010005225 A2 | 1/2010 |
| WO | WO-2011109798 A2 | 9/2011 |
| WO | WO-2011109798 A3 | 9/2011 |

OTHER PUBLICATIONS

"International Application Serial No. PCT/US2011/027327, International Preliminary Report on Patentability mailed Sep. 20, 2012", 8 pgs.

"International Application Serial No. PCT/US2011/027327, Search Report mailed Nov. 22, 2011", 3 pgs.

(Continued)

*Primary Examiner* — Anh Ngoc Nguyen
(74) *Attorney, Agent, or Firm* — Schwegman, Lundberg & Woessner, P.A.

(57) ABSTRACT

Embodiments of a system and method for handover and zone switching between legacy and non-legacy base stations are provided. In certain embodiments, a fast ranging IE allocation is used to transfer a dedicated allocation to a mobile station for ranging with a target base station.

14 Claims, 7 Drawing Sheets

(56) References Cited

OTHER PUBLICATIONS

"International Application Serial No. PCT/US2011/027327, Written Opinion mailed Nov. 22, 2011", 6 pgs.

"Japanese Application Serial No. 2012-556282, Amendment filed Feb. 25, 2013", 8 pgs.

Japanese Application Serial No. 2012-556282, Office Action mailed Nov. 5, 2013, w/English translation, 4 pgs.

Korean Application Serial No. 10-2012-7026020, Office Action mailed Jan. 24, 2014, w/English translation, 15 pgs.

* cited by examiner

HANDOVER BETWEEN LEGACY AND NON-LEGACY WIMAX NETWORKS

PRIORITY APPLICATION

This application claims the benefit of priority under 35 U.S.C. 119(e) to U.S. Application Ser. No. 61/311,174 filed on Mar. 5, 2010, which is incorporated herein by reference in its entirety.

BACKGROUND

On occasion wireless standards are updated for various reasons. Once the update is approved by the reviewing committee, the update is typically released as a new version of the standard. For example, the Institute of Electrical and Electronics Engineers (IEEE) developed the 802.16 standard for wireless broadband communication. The 802.16 standard has released several versions including 802.16e for mobile wireless devices. A future version of 802.16 includes 802.16m having support for higher data rates between a subscriber and a provider device. Another standard that has released several versions includes the Long-Term Evolution (LTE). Each version of LTE is referred to as a release number (e.g., release number 8).

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present inventors have recognized, among other things, systems and methods for handover between base stations within a system conforming to one or more standards within the IEEE 802.16 family of standards. IEEE 802.16m standards support optimized handoff features not present in legacy IEEE 802.16e systems. Accordingly, the most optimized handoff procedures can only be implemented when all devices being utilized for the handoff can perform the optimized handoff procedure (e.g., conform to the IEEE 802.16m standard). The system and methods described herein provide semi-optimized handoff between base stations, when not all devices support the most optimized handoff procedure.

Figure 1:
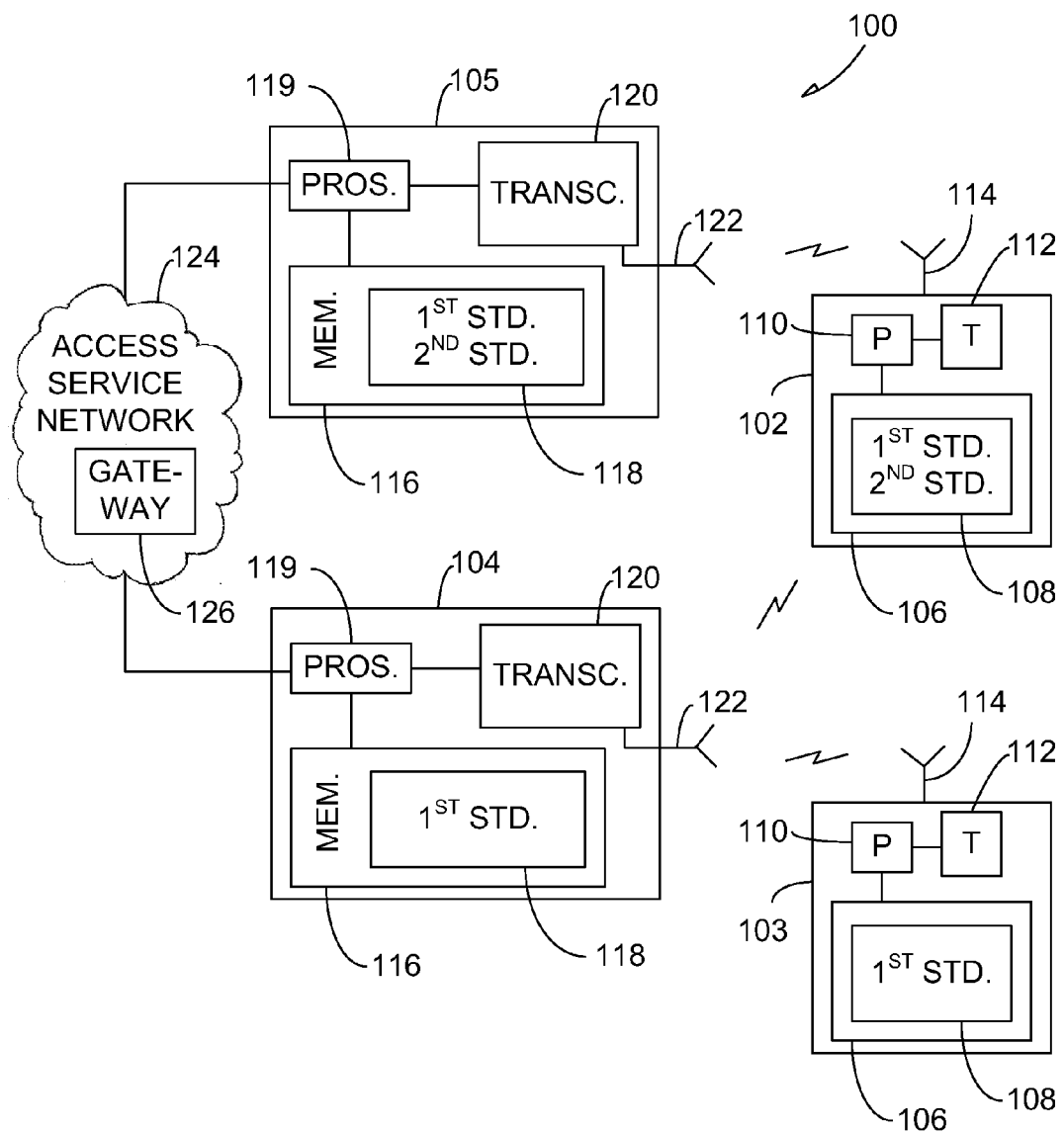
FIG. 1 illustrates an example of a wireless system having a plurality of mobile stations in communication with a plurality of base stations.

FIG. 1 illustrates one example of a wireless communication system 100. The wireless communication system 100 can include a plurality of mobile stations 102, 103 in wireless communication with one or more base stations 104, 105. Each mobile station 102, 103 can include a memory 106 for storage of instructions 108 for execution on processing circuitry 110 of the mobile stations 102, 103. The instructions 108 can comprise software configured to cause the mobile stations 102, 103 to perform actions for wireless communication between the mobile stations 102, 103 and the base stations 104, 105. In an example, the instructions 108 can include instructions for implementing a first version and/or a second version of a communication standard as explained in greater detail below. Each mobile station 102, 103 can also include an RF transceiver 112 for transmission and reception of signals coupled to an antenna 114 for radiation of sensing of signals for the RF transceiver 112.

In an example, the mobile stations 102, 103 can be configured to operate in accordance with one or more frequency bands and/or standards profiles including a Worldwide Interoperability for Microwave Access (WiMAX) standards profile, a WCDMA standards profile, a 3G HSPA standards profile, and a Long Term Evolution (LTE) standards profile. In some examples, the mobile stations 102, 103 can be configured to communicate in accordance with specific communication standards, such as the Institute of Electrical and Electronics Engineers (IEEE) standards. In particular, the mobile stations 102, 103 can be configured to operate in accordance with one or more standards of the IEEE 802.16 family of standards for wireless metropolitan area networks (WMANs) including variations and evolutions thereof. For example, the mobile stations 102, 103 can be configured to communicate using the IEEE 802.16-2004, the IEEE 802.16 (e), and/or the 802.16(m) standards of the 802.16 family. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some examples, RF transceiver 112 can be configured to communicate orthogonal frequency division multiplexed (OFDM) communication signals which comprise a plurality of orthogonal subcarriers. In some of these multicarrier examples, the mobile stations 102, 103 can be a broadband wireless access (BWA) network communication station, such as a Worldwide Interoperability for Microwave Access (WiMAX) communication station. In these broadband multicarrier examples, the mobile stations 102, 103 can be configured to communicate in accordance with an orthogonal frequency division multiple access (OFDMA) technique.

In other examples, the mobile stations 102, 103 can be configured to communicate using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

In some examples, the mobile stations 102, 103 can be a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that can receive and/or transmit information wirelessly.

In an example, the base stations 104, 105 can include a memory 116 for storage of instructions 118 for execution on processing circuitry 119 of the base stations 104, 105. The instructions 118 can comprise software configured to cause the base stations 104, 105 to perform actions for wireless communication with the plurality of mobile stations 102, 103 and for communication with another communication network 124 (e.g. a plain old telephone service (POTS) network). In an example, the instructions 118 can include instructions for implementing a first standard and/or a second standard of a family of standard as explained in greater detail below. The base stations 104, 105 can also include an RF transceiver 120 for transmission to and from the mobile stations 102, 103 and an antenna 122 communicatively coupled to the RF transceiver 120. In certain examples, the RF transceiver 120 and the antenna 122 can be housed in the same location as the memory 116 and the processing circuitry 119, and in other examples, the RF transceiver 120 (or portions thereof) and/or antenna 122 can be located remotely from the memory 116 and the processing circuitry 119, such as in a distributed base station.

In some examples, the RF transceiver 120 can be configured to communicate OFDM communication signals which comprise a plurality of orthogonal subcarriers, and, in particular, an OFDMA technique. In other examples, the RF transceiver 120 can be configured to communicate using one or more other modulation techniques such as spread spectrum modulation (e.g., DS-CDMA and/or FH-CDMA), TDM modulation, and/or FDM modulation.

In an example, the base stations 104, 105 can be configured to operate in accordance with one or more frequency bands/carriers and/or standards profiles including a WiMAX standards profile, a WCDMA standards profile, a 3G HSPA standards profile, and an LTE standards profile. In some examples, the base stations 104, 105 can be configured to communicate in accordance with specific communication standards, such as the IEEE standards. In particular, the base stations 104, 105 can be configured to operate in accordance with one or more versions of the 802.16 including variations and evolutions thereof. For example, the base stations 104, 105 can be configured to communicate using the IEEE 802.16-2004, the IEEE 802.16(e), and/or the 802.16(m) standards of the 802.16 family.

In an example, the base station 104 can communicate with the mobile stations 102, 103 using only a single version of a communication standard (referred to herein as a "single zone base station"). In an example, the base station 105 can communicate with the mobile stations 102, 103 using two or more versions of a communication standard (referred to herein as a "mixed zone base station"). In an example, a mixed zone base station 105 provides first and second zones for communicating with the mobile stations 102, 103. In the first zone, the base station 105 communicates with the mobile stations 102, 103 using a first standard of a family of standards. In the second zone, the base station communicates with the mobile stations 102, 103 using a second standard of the family of standards. For example, the base station 105 can communicate using the 802.16(e) standard of the 802.16 family in the first zone and the 802.16(m) standard in the second zone. The mixed zone base station 104 can communicate concurrently with mobile stations 102 in the first zone and the second zone. That is, in a single communication frame, the mixed zone base station 104 can communicate with both the mobile station 102 in the first zone using the first standard of the family and the mobile station 103 in the second zone using the second standard of the family.

The access service network (ASN) 124 can include one or more gateways 126 for routing communications between base stations 104, 105 among other things. The gateway 126 can operate in accordance with one or more standards. For example, the gateway 126 can operate according to one or more standards provided by the WiMAX forum, such as ASN 1.0 and ASN 2.0. ASN 1.0 was released with 802.16e, and supports the features thereof, but ASN 1.0 does not support all the optimized handover features of 802.16m. Accordingly, ASN 2.0 however, does support the features of 802.16m including the optimized handover. Since an access service network 124 can include one or more gateways 124, which can conform to either ASN 1.0 or ASN 2.0, the access service network 124 may comprise a mix of gateways 126 supporting ASN 1.0 and gateways supporting ASN 2.0. As used herein an ASN 1.0 network comprises an ASN network where one or more gateways 126 conform to ASN 1.0 and do not support ASN 2.0 (e.g., where one or more gateways do not support 802.16m). Also, as used herein an ASN 2.0 network comprises an ASN network where all gateways 126 conform to ASN 2.0 (e.g., where all gateways support 802.16m).

Since devices (e.g., base stations 104, gateways 126) within the communication network 100 can be upgraded individually over time, there devices with different capabilities operating simultaneous within the network 100. Due to this, there are a number of different possibilities for connections between two base stations 104, 105. A first example includes both base station 104 and base station 105 supporting 802.16m, and ASN 124 supporting ASN 2.0. In this first example, optimized handover can occur since all devices supports the optimized handover features of 802.16m.

Figure 2:
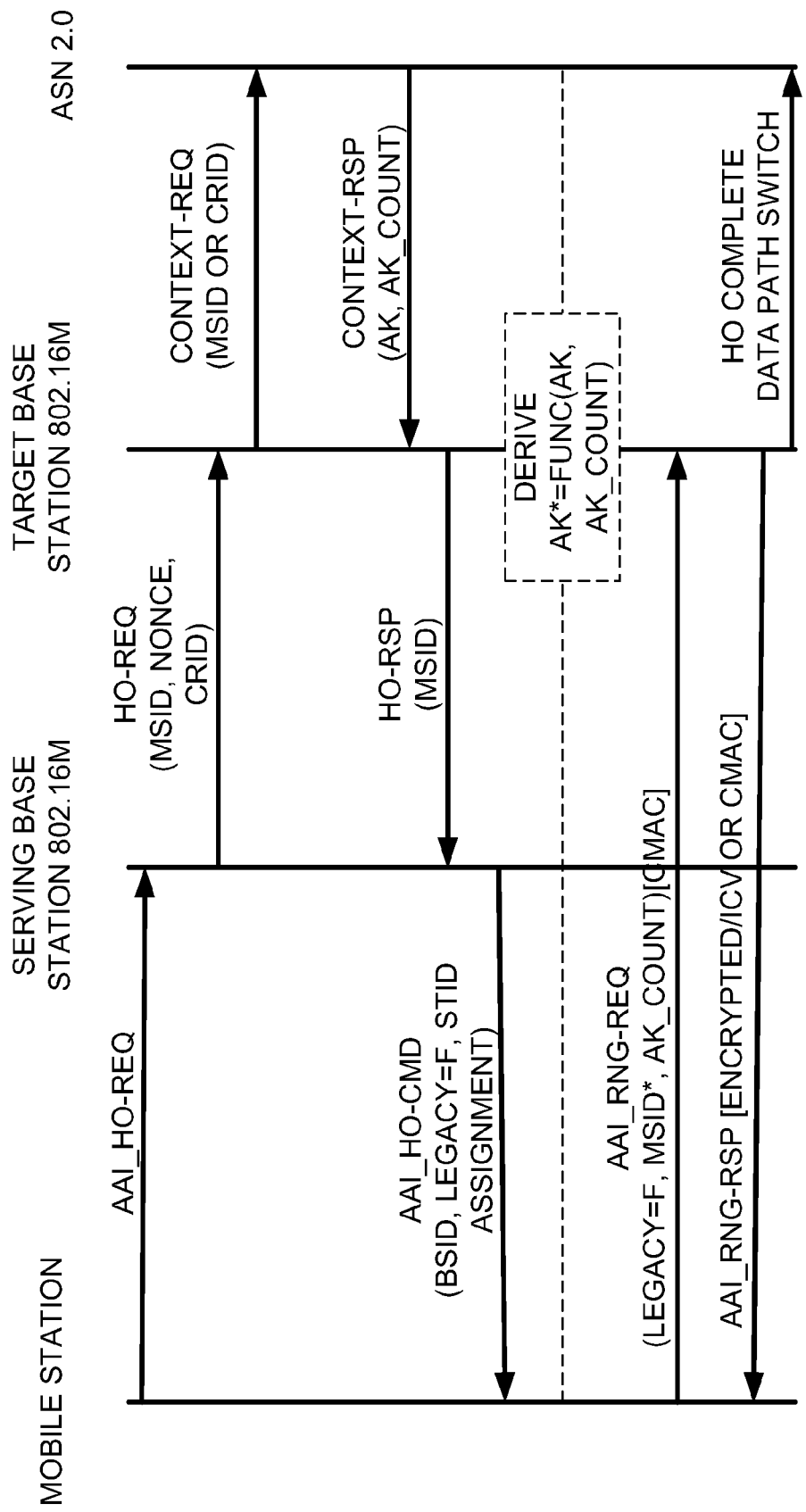
FIG. 2 illustrates an example of a handover protocol between an IEEE 802.16m serving base station and an IEEE 802.16m target base station using an ASN 2.0 network.

FIG. 2 illustrates an example of an optimized handover between base station 104 and base station 105 through ASN 124 when both base station 104 and base station 105 support 802.16m and ASN 124 supports ASN 2.0. Since both the serving base station 104 and the target base station 105 understand the hashed MSID (also referred to herein as MSID*) used in optimized handover to increase privacy, the optimized handover can be used. Moreover, both the serving base station 104 and the target base station 105 also support dedicated ranging and mobile station ID (STID) pre-assignment, the target base station 105 can determine which mobile station is trying to perform network re-entry during the handover, even if the true MSID is not exposed in the ranging request message (AAI_RNG-REQ). Thus, the target base station 105 can identify the mobile station 102 via known dedicated ranging code and subsequently allocate a unicast uplink grant, or the mobile station 102 can perform a bandwidth request with pre-assigned STID to request unicast uplink grant for transmission of the ranging request message. In an example, the mobile station 102 and the target base station 105 can automatically derive the required keys (AK) for data encryption and integrity protection.

As shown in FIG. 2, the mobile station 102 sends a handover request (AAI_HO-Req) to the serving base station 104 to handover to the target base station 105. Upon receiving the handover request, the serving base station 104 sends a handover request (HO-Req) to the target base station 105 identifying the mobile station 102 for the target base station via the MSID of the mobile station 102. Once the target base station 105 receives the handover request from the serving base station, the target base station 105 sends a context request (Context-Req) to a gateway 126 in the ASN network 124. The contest request identifies the mobile station 102 via the MSID or CRID. The gateway 126 then responds to the target base station 105 (Context-Rsp) with an authentication key corresponding to the mobile station 102. Once the target base station 105 has received the authentication key, the target base station 105 sends a handover response (HO-Rsp) to the serving base station 104 indicating that the target base station 102 is ready for handover of the mobile station 102. The serving base station 104 then sends a handover command (AAI_HO-CMD) indicating the base station ID (BSID2) for the target base station 105 and the STID assignment for the mobile station when communicating with the target base station 105.

Since the mobile station 102 and the target base station 105 both support 802.16m, the mobile station 102 and the target base station 105 can derive a hash of the authentication key (AK*) and the ranging request (AAI_RNG-REQ) from the mobile station 102 to the target base station 105 can include a hash of the mobile station's 102 MSID. Accordingly, the mobile station's 102 MSID can be secured in the ranging request and the target base station 105 can still identify the mobile station 102. Once the target base station 105 has received the ranging request, the target base station 105 can respond with an encrypted ranging response (AAI_RNG-RSP). Then the target base station 105 can notify the ASN network 124 that the handover is complete and the ASN network 124 can switch the data path corresponding to the mobile station 102 from the serving base station 104 to the target base station 105.

FIG. 2 illustrates an optimized handover situation where the serving base station 104, the target base station 105, and the ASN network 124 all support the optimized handover features in 802.16m. However, other network configurations may be present. A second configuration includes the target base station 105 supporting 802.16m, while the serving base station only supports 802.16e and the ASN 124 network supports ASN 2.0.

Figure 3:
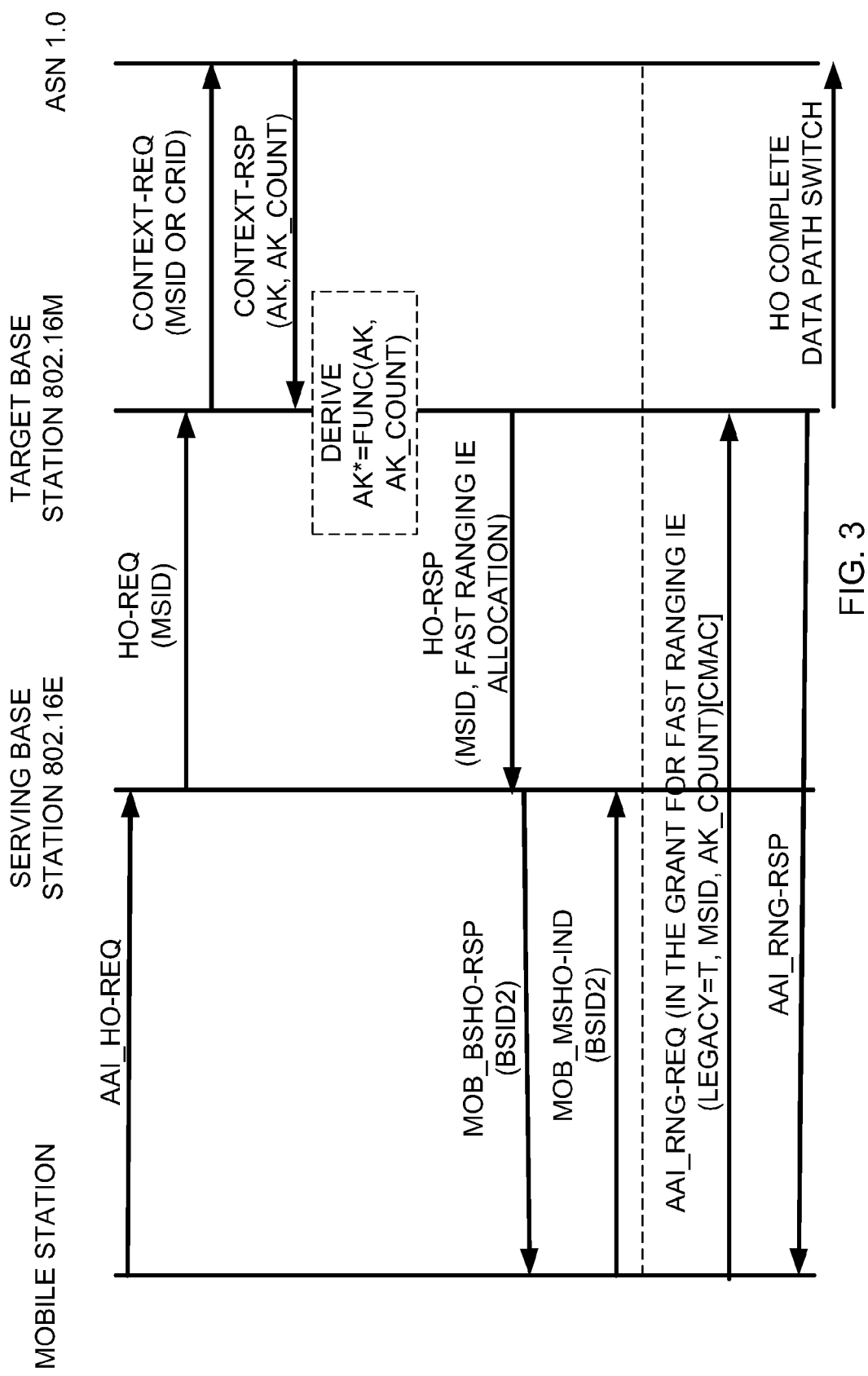
FIG. 3 illustrates an example of a handover protocol between an IEEE 802.16e serving base station and an IEEE 802.16m target base station using an ASN 2.0 network.
Figure 4:
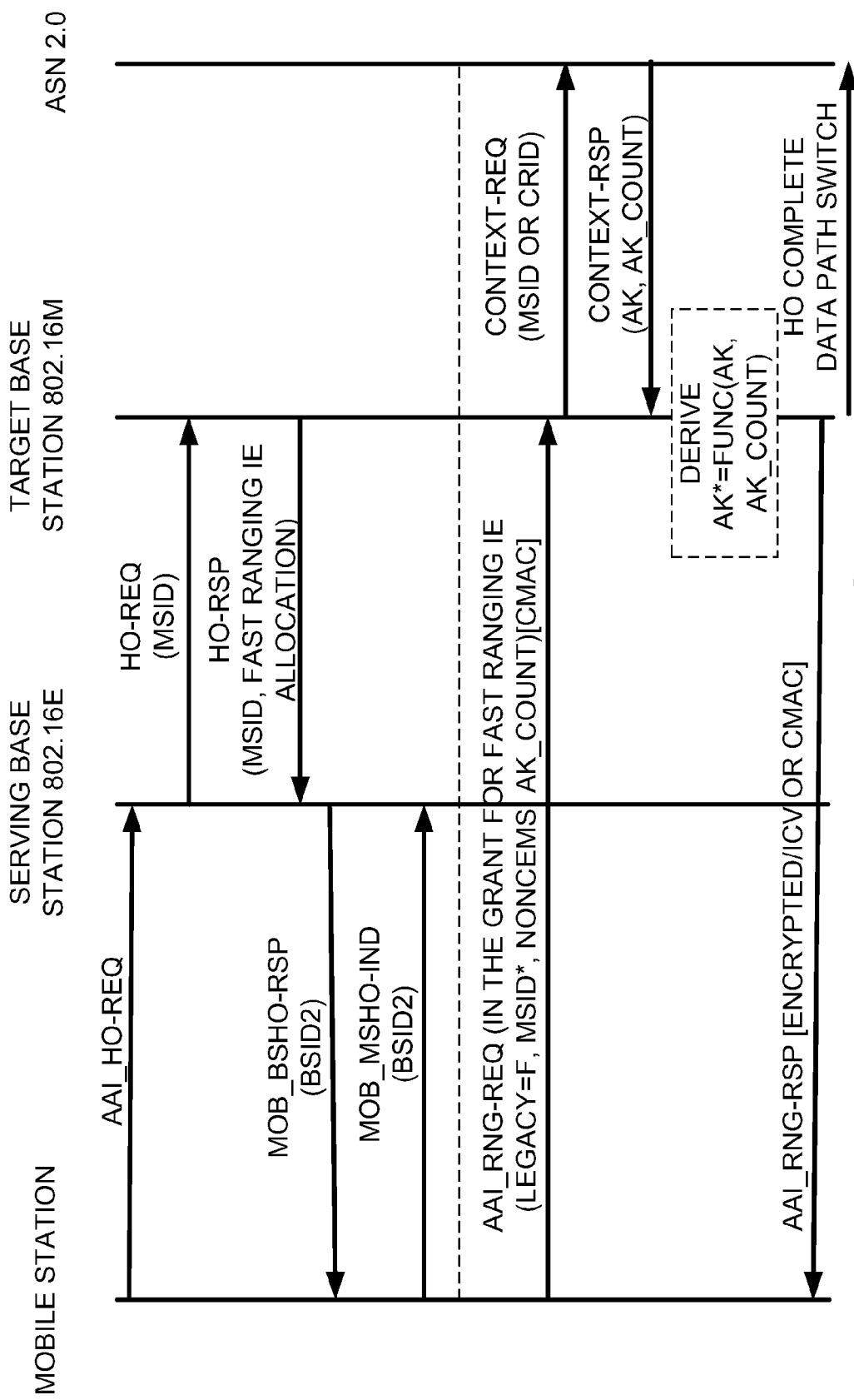
FIG. 4 illustrates an example of a handover protocol between an IEEE 802.16e serving base station and an IEEE 802.16m target base station using an ASN 1.0 network.

FIG. 3 illustrates this second configuration. Since the serving base station 104 does not understand 802.16m specific messages, the serving base station 104 cannot understand STID pre-assignment. Additionally, the serving base station 104 cannot handle dedicated ranging code allocation for the mobile station 102. Without STID pre-assignment and dedicated ranging code allocation, it is difficult for the target base station 105 to determine which mobile station 102 is sending a ranging request message without full network entry by the mobile station 102. Additionally, the mobiles station 102 cannot disclose its real MAC address to the target base station 105 due to the security requirement of 802.16m. Notably, the real MAC address cannot be disclosed since 802.16m requires the true MAC address to be encrypted when sent. Without the mobile station's 102 real MAC address, the target base station 105 cannot identify who the mobile station 102 is and cannot obtain the keys from the ASN 124 corresponding to the mobile station 102.

Thus, to improve the handover without full network re-entry by the mobile station 102 at the target base station 105, the target base station 105 can provide a dedicated allocation for the mobile station 102 to send a ranging request. In an example, the dedicated allocation can include a dedicated bandwidth allocation. In another example, the dedicated allocation can include a dedicated ranging code (e.g., a CDMA code). Since the allocation is dedicated only to the mobile station 102, the target base station 105 can identify the mobile station 102, since the mobile station 102 will be the only mobile station 102 communicating within the allocation. To communicate this dedicated allocation from the target base station 105 to the serving base station 104, the target base station 105 can use a fast ranging IE allocation. Notably, the target base station 105 sends a fast ranging IE allocation message to the serving base station 104 wherein the fast ranging IE allocation corresponds to the dedicated allocation for the ranging request of the mobile station 102. The serving base station 104 can then notify the mobile station 102 of the dedicated allocation, since the serving base station 104 understands the fast ranging IE allocation.

As shown in FIG. 3, the mobile station 102 sends a handover request (MOB_MSHO-REQ) to the serving base station 104. The serving base station 104 sends a handover request (HO-Rsp) to the target base station 105. The target base station 105 then sends a handover response (HO-Rsp) to the serving base station 104. The handover response (HO-Rsp) includes a fast ranging ID allocation corresponding to the dedicated uplink allocation for the ranging request of the mobile station 102. The serving base station 104 then sends a handover response (MOB_BSHO-RSP) to the mobile station 102. Then, the mobile station 104 sends an indication of reception (MOB_MSCHO-IND) of the handover response and ends communication with the serving base station 104.

The mobile station 102 then sends a ranging request (AAI_RNG-REQ) to the target base station 105 within the dedicated allocation provided by the fast ranging IE allocation. The target base station 105 can identify the mobile station 102, since this is the only mobile station 102 allocated to this bandwidth or ranging code. Once the target base station 105 receives the ranging request including the hashed MSID, the Nonce, and the AK_COUNT, the target base station 105 can send a context request to the gateway 126 in the ASN 124. The gateway can then send a context response with the authentication key. The target base station 105 can then derive the authentication key and send a ranging response. Once the ranging response is sent, the target base station 105 can indicate to the ASN 124 that the handover is complete and the data path can be switched to the target base station 105.

In this configuration, the security keys have to be refreshed from the AK level since the new AK must bind to MSID*, and this cannot be done before getting MSID* in the ranging request. This adds some additional network latency as compared to the optimized handover of FIG. 2. Additionally, the fast ranging IE allocation is an optional feature for the serving base station 104. Accordingly, if the serving base station does not support fast ranging IE allocation, then the above procedure is not possible. Instead, the mobile station 102 can perform full network re-entry.

FIG. 3 illustrates a third configuration where, similar to the second configuration, the serving base station 104 supports 802.16e (and not 802.16m) and the target base station 105 supports 802.16m. In this third configuration however, the ASN 124 supports ASN 1.0 and not ASN 2.0. The main challenge when using ASN 1.0 is to optimize when the target base station 105 can identify the incoming mobile station 102, and since there are no security key refresh base on MSID*, all handover scenarios are fairly optimized even in the worst case. Note that ASN 1.0 does not understand any 802.16m specific context and ASN 1.0 deployment may or may not have a physical inter-base station R8 link which would enable two base stations to communicate without having to be processed by the gateway 126. An R8 link can allow the gateway 126 to simply relay messages between the base stations, thus it doesn't matter what messages the gateway 126 can actually understand since the gateway 126 does not need to decode the messages. If an R8 link is present, two 802.16 base stations can talk directly to each other. In any case, some examples may include an R8 link and other examples may not include an R8 link.

Referring back to FIG. 3, the protocol used by the third configuration is similar to the second configuration (e.g., using the fast ranging IE allocation), except that the mobile station 102 provides the real MSID (not MSID*) to the target base station 104 in the ranging request message and only the target base station 105 can translate the dedicated allocation into a fast ranging IE allocation, where in the second configuration this could be done with either the target base station 105 or the ASN 124. Additionally, since MSID* is not required in key derivation, the AK transfer between the target base station 105 and the ASN 124 can happen before the ranging request from the mobile station 102.

A fourth and fifth configurations are similar to the second and third configurations respectively, except that the mobile station 102 is performing zone switching instead of a handover. Zone switching has the advantage that the zone switching is performed by a single base station 105. Accordingly, in both the fourth and fifth configurations, the base station 105 can insert a "zone switching" TLV in an 802.16e based MAC control message (e.g., a ranging request message (RNG-REQ)). This can allow STID pre-assignment when it triggers zone-switching. The remaining procedure is the same as the respective second and third configurations.

Figure 5:
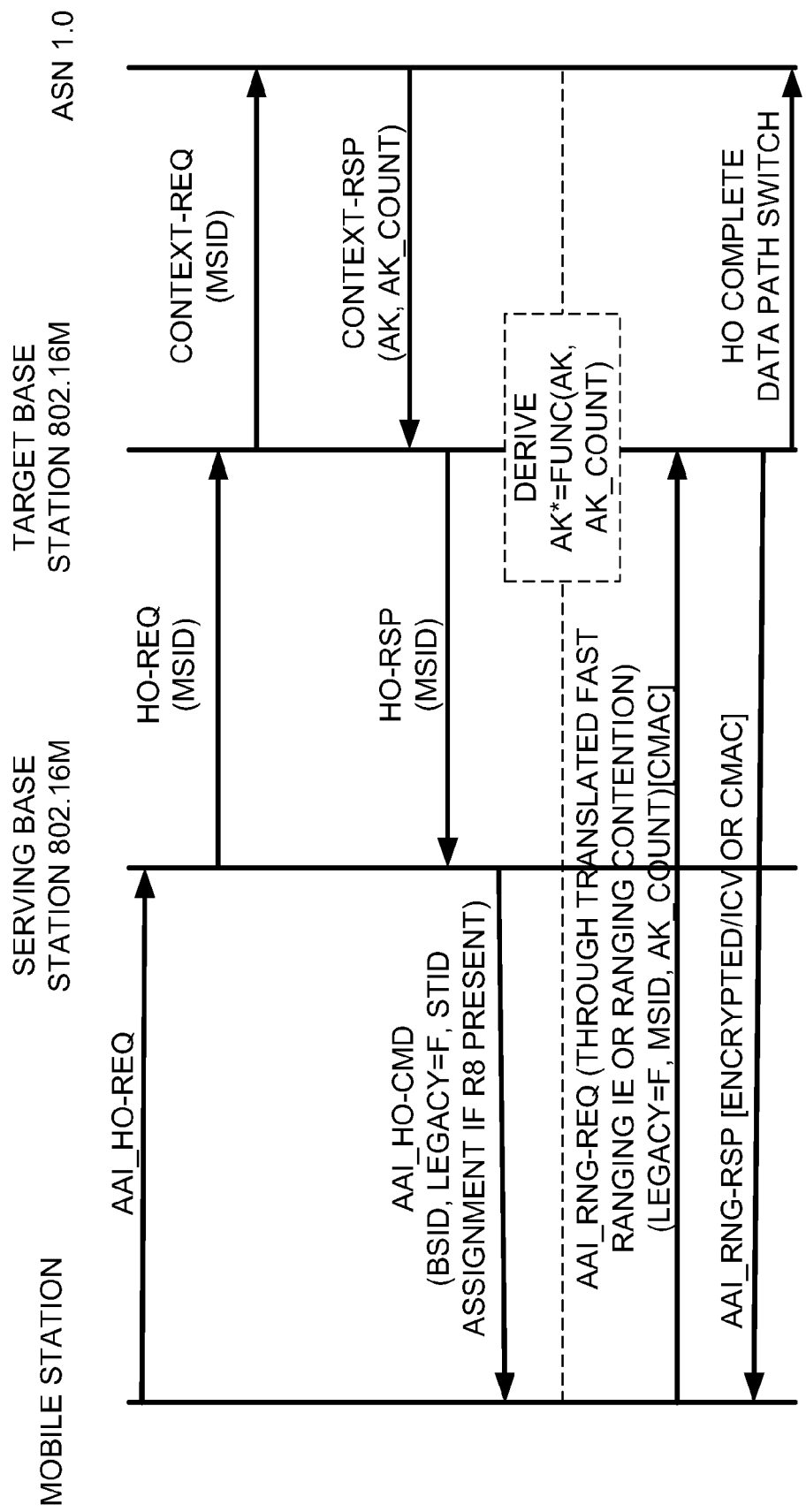
FIG. 5 illustrates an example of a handover protocol between an IEEE 802.16m serving base station and an IEEE 802.16m target base station using an ASN 1.0 network.

FIG. 5 illustrates a handover protocol in a sixth configuration where a serving base station 104 supports 802.16m and a target base station 105 supports 802.16m when the ASN network supports ASN 1.0 and not ASN 2.0. If there is an R8 link between the serving base station 104 and the target base station 105, STID pre-assignment is possible. In any case, the handover call flow is the same as that shown in FIG. 2. However, if STID pre-assignment is not possible (e.g., when only an R6 connection is available which cannot bass the new TLV information for STID pre-assignment), a dedicated allocation translated into a fast ranging IE allocation could be used for the ranging request of the mobile station 102. Here, both the serving base station 104 and the target base station 105 could translate between the dedicated allocation request and the fast ranging IE allocation. Then the ASN 1.0 network can receive the dedicated allocation request as a fast ranging IE allocation and understand the message. In another example, the mobile station 102 can use contention-based handover ranging with the target base station 105 to receive the dedicated allocation. In the worst case, the contention based ranging can be used and MSID will be provided in AAI-RNG-REQ, upon which the mobile station 102 is finally identified by the target base station 105.

All remaining configurations involve a handover to a target base station 105 when the target base station 105 supports 802.16e and not 802.16m. In these configurations, regardless of the support of the serving base station 104 or the ASN 126, since the target base station 105 does not support the optimized handover procedure, no new optimization procedures can be used other than the typical 802.16e based protocols. Additionally, since the 802.16e base station does not require the security of the 802.16m standard, there are not MSID security concerns in the handover either. Thus, in configurations where the target base station 105 supports 802.16e and not 802.16m, no new procedures are used. This is true also when zone switching to an 802.16e zone, no new procedures are used.

Figure 6A:
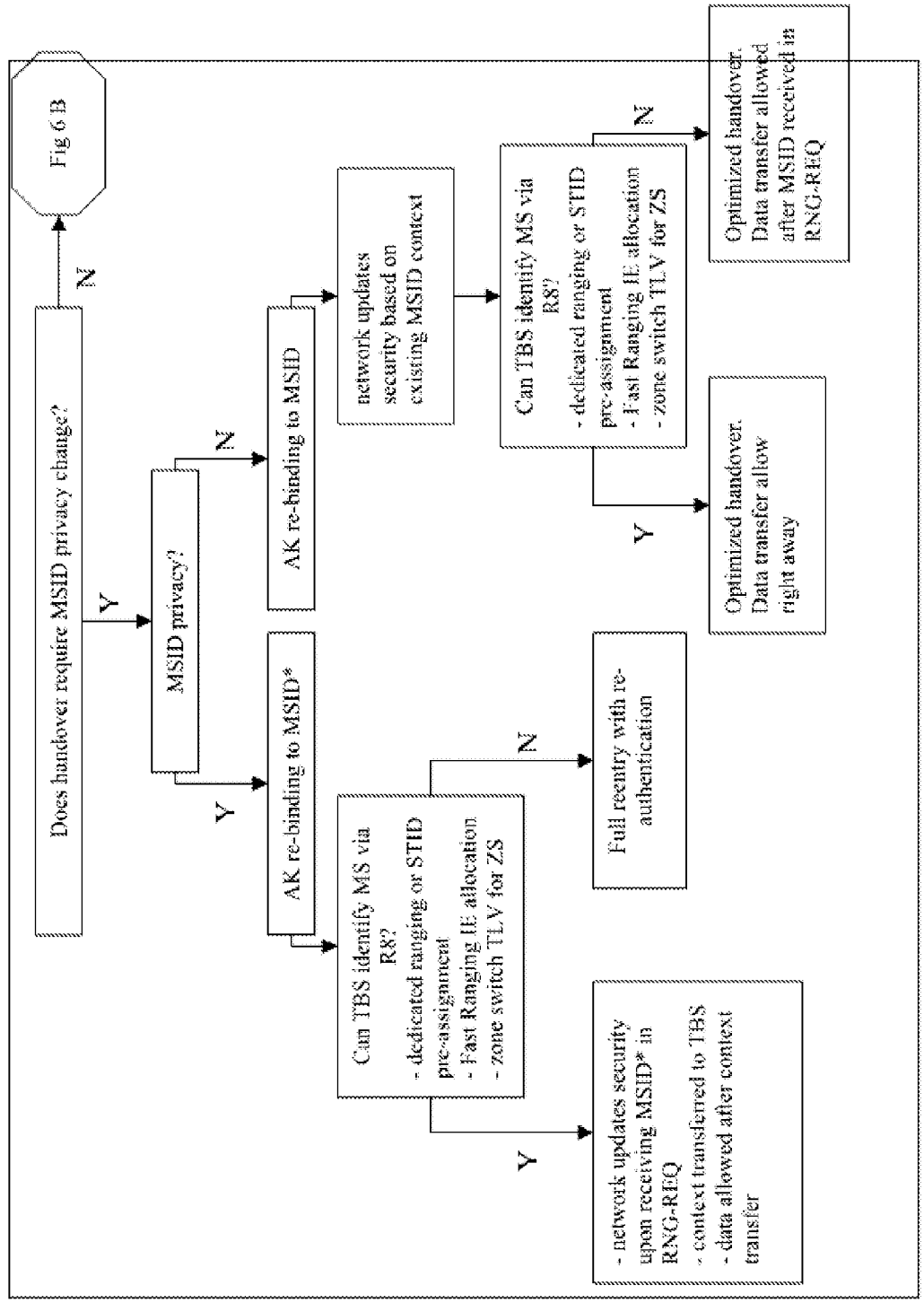
FIGS. 6A and 6B illustrate an example of a method for seamless zone switching from a first zone to a second zone of a base station.
Figure 6B:
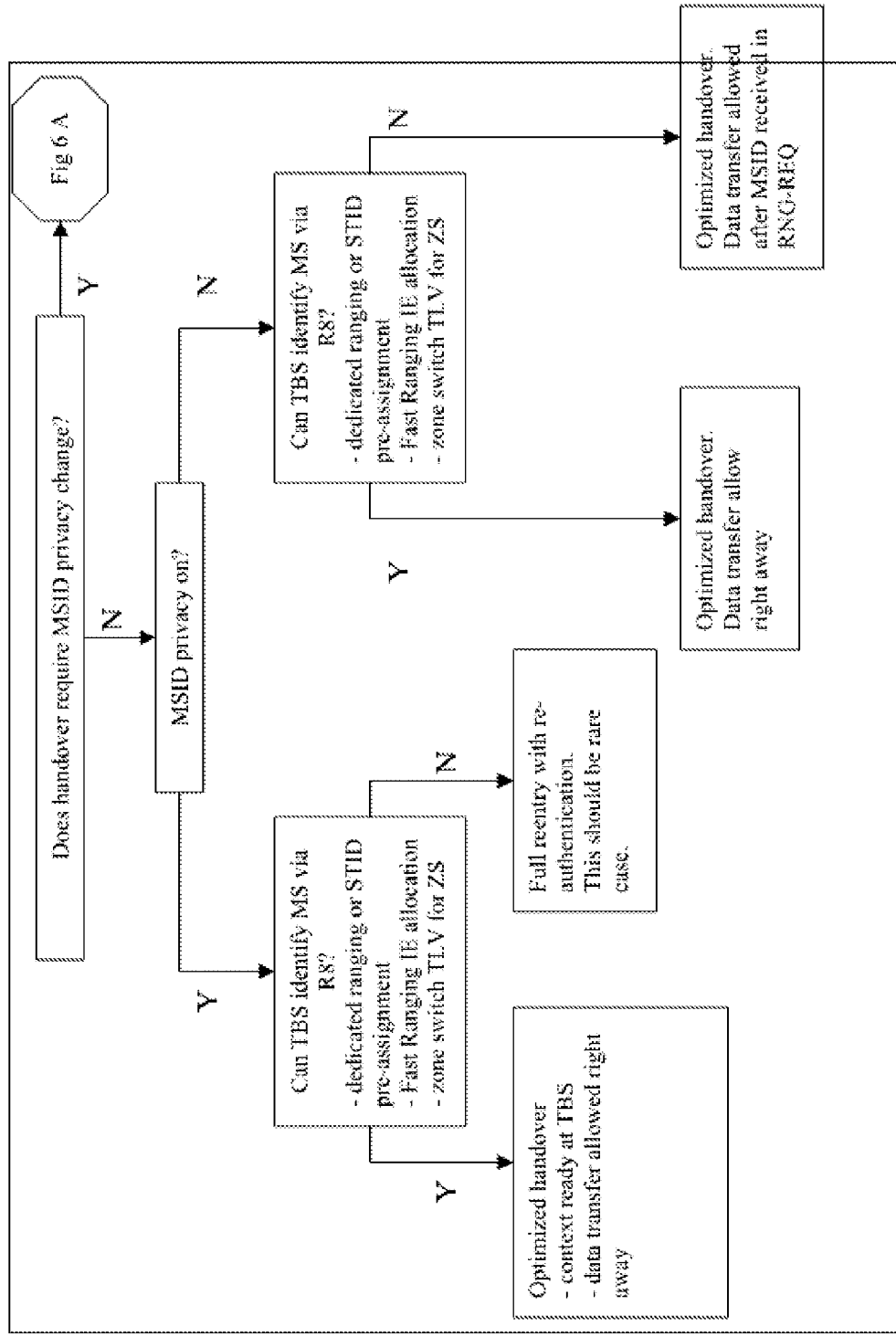

FIGS. 6A and 6B illustrate an overall method for performing a handover between a serving base station 104 and a target base station 105. As shown in FIG. 6A, a base station for performing a handover can first determine whether a handover will require a privacy change for a mobile station. That is, the base station can determine whether a handover will require a change from 802.16m privacy to 802.16e privacy or vice-versa. If a privacy change in required, then the method can proceed downward on FIG. 6A to determine whether the target base station 105 does require 802.16m privacy or not (e.g., whether the target base station is an 802.16m base station). If the target base station does require 802.16m privacy, then the method can proceed down the left path and the AK can be re-binding to the MSID*. Continuing down that path, the base station can determine whether one or more of the following: the target base station 105 can identify the mobile station via an R8 connection, whether a fast ranging IE allocation is supported, whether it is a zone switch, and whether dedicated ranging or STID pre-assignment can be used. If one or more of these features are available, then the handover can proceed with a partially optimized handover based on the features available. If none of these features are available, then the mobile station 102 will perform full-network re-entry and authentication.

The right path in FIG. 6A can be followed when the target base station 105 does not require 802.16m privacy. On this path, the AK is re-binding to the MSID and updates and security are based on the existing MSID. Here again the base station can determine whether one or more of the following: the target base station 105 can identify the mobile station via an R8 connection, whether a fast ranging IE allocation is supported, whether it is a zone switch, and whether dedicated ranging or STID pre-assignment can be used. If an R8 connection is available, an optimized handover can be used. If not, then data transfer is allowed after the MSID is received in the ranging request message.

FIG. 6B illustrates a method when an MSID privacy change is not needed. Following this path, the base station first determines if MSID privacy is currently being used by the serving base station. If MSID privacy is currently being used, then the method follows the left path. Here, the base station can determine whether one or more of the following: the target base station 105 can identify the mobile station via an R8 connection, whether a fast ranging IE allocation is supported, whether it is a zone switch, and whether dedicated ranging or STID pre-assignment can be used. If an R8 connection is present, then optimized handover can occur. If none of the features are available, then full-network re-entry and authentication can occur.

Referring back to the top of FIG. 6B, if MSID privacy is not current being used by the serving base station. If MSID privacy is currently being used, then the method follows the right path. In the right path, the base station can determine whether one or more of the following: the target base station 105 can identify the mobile station via an R8 connection, whether a fast ranging IE allocation is supported, whether it is a zone switch, and whether dedicated ranging or STID pre-assignment can be used. If an R8 connection is present, an optimized handover can occur and data transfer can occur right away. If an R8 connection is not present, an optimized handover can occur, and data transfer is allowed after MSID receiving in the ranging request message.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for wireless communication performed by a mobile subscriber station, the method comprising:
sending a handover request of a data path originating from the mobile subscriber station, the handover request transmitted from the mobile subscriber station to a serving base station for the mobile subscriber station;
receiving a dedicated allocation at the mobile subscriber station from the serving base station for performing ranging with a target base station in response to the handover request,
wherein the serving base station conforms to a first version and the target base station conforms to a second version of a standard from a common standards family, and wherein the handover request conforms to the first version;
sending a ranging request from the mobile subscriber station to the target base station using the dedicated allocation,
wherein the dedicated allocation includes an identifier dedicated to the mobile subscriber station by the target base station in response to the handover request, and wherein the ranging request conforms to the second version; and
receiving a ranging response at the mobile subscriber station from the target base station.

2. The method of claim 1, wherein the dedicated allocation is an allocation indicated by a fast ranging information element (IE), and wherein the identifier dedicated to the mobile subscriber station is a dedicated ranging code that is transferred to the mobile subscriber station using the fast ranging IE.

3. The method of claim 1, wherein the handover request comprises a message conforming to an IEEE 802.16e standard.

4. The method of claim 1, wherein the ranging request comprises a message conforming to an IEEE 802.16m standard.

5. A wireless device comprising:
a radio frequency (RF) transceiver for transmitting and receiving signals from a base station; and
processing circuitry communicatively coupled to the RF transceiver and configured to:
send a handover request of a data path originating from the mobile subscriber station, the handover request sent from the wireless device to a serving base station for the wireless device;
receive a dedicated allocation from the serving base station for performing ranging with a target base station;
send a ranging request from the wireless device to the target base station within the dedicated allocation, wherein the dedicated allocation includes an identifier dedicated to the wireless device by the target base station in response to the handover request; and
receive a ranging response from the target base station;
wherein the serving base station operates according to a first wireless standard and wherein the target base station operates according to a second wireless standard from a common standards family,
wherein the handover request conforms to the first wireless standard, and wherein the ranging request conforms to the second wireless standard.

6. The wireless device of claim 5, wherein the dedicated allocation includes an allocation indicated by a fast ranging information element (IE), and wherein the identifier dedicated to the wireless device is a dedicated ranging code that is transferred to the wireless device using the fast ranging IE.

7. The wireless device of claim 5, wherein the handover request comprises a message conforming to an IEEE 802.16e standard.

8. The wireless device of claim 5, wherein the ranging request comprises a message conforming to an IEEE 802.16m standard.

9. The wireless device of claim 7, wherein the second base station operates according to an IEEE 802.16m standard.

10. The wireless device of claim 7, wherein communication with the second base station takes place through an access service network operating according to an Access Service Network (ASN) 1.0 protocol.

11. A method for wireless communication performed by a mobile subscriber station, the method comprising:
sending a zone switching request of a data path originating from the mobile subscriber station, the zone switching request transmitted from the mobile subscriber station to a base station for the mobile subscriber station in a first zone of the base station;
receiving a dedicated allocation at the mobile subscriber station from the base station for performing ranging with a second zone of the base station in response to the zone switching request,
wherein the first zone of the base station conforms to a first version and the second zone of the base station conforms to a second version of a standard from a common standards family, and wherein the zone switching request conforms to the first version;
sending a ranging request from the mobile subscriber station to the target second zone of the base station within the dedicated allocation,
wherein the dedicated allocation includes an identifier dedicated to the mobile subscriber station by the second zone of the base station in response to the zone switching request, and wherein the ranging request conforms to the second version; and
receiving a ranging response at the mobile subscriber station from the target second zone of the base station.

12. The method of claim 11, wherein the dedicated allocation includes an allocation indicated by a fast ranging information element (IE), and wherein the identifier dedicated to the mobile subscriber station is a dedicated ranging code that is transferred to the mobile subscriber station using the fast ranging IE.

13. The method of claim 11, wherein the handover request comprises a message conforming to an IEEE 802.16e standard.

14. The method of claim 11, wherein the ranging request comprises a message conforming to an IEEE 802.16m standard.

* * * * *

UNITED STATES PATENT AND TRADEMARK OFFICE
CERTIFICATE OF CORRECTION

PATENT NO.        : 8,718,013 B2                                           Page 1 of 1
APPLICATION NO.   : 13/041371
DATED             : May 6, 2014
INVENTOR(S)       : Yang et al.

It is certified that error appears in the above-identified patent and that said Letters Patent is hereby corrected as shown below:

In the Claims

In column 10, line 40, in Claim 11, after "the", delete "target", therefor

In column 10, line 48, in Claim 11, after "the", delete "target", therefor

Signed and Sealed this
Second Day of December, 2014

Michelle K. Lee
*Deputy Director of the United States Patent and Trademark Office*